US010726628B2

(12) United States Patent
Sumner et al.

(10) Patent No.: US 10,726,628 B2
(45) Date of Patent: *Jul. 28, 2020

(54) DEFORMABLE-SURFACE TRACKING BASED AUGMENTED REALITY IMAGE GENERATION (71) Applicant: Disney Enterprises, Inc., Burbank, CA (US)

(72) Inventors: Robert Sumner, Zurich (CH); Dat Tien Ngo, Ecublens (CH); Maurizio Nitti, Zurich (CH); Alessia Marra, Zurich (CH); Stephane Magnenat, Zurich (CH); Mattia Ryffel, Bern (CH)

(73) Assignee: Disney Enterprises, Inc., Burbank, CA (US)

(*) Notice: Subject to any disclaimer, the term of this patent is extended or adjusted under 35 U.S.C. 154(b) by 1 day.

This patent is subject to a terminal disclaimer.

(21) Appl. No.: 16/133,372

(22) Filed: Sep. 17, 2018

(65) Prior Publication Data
US 2019/0019342 A1    Jan. 17, 2019

Related U.S. Application Data (63) Continuation of application No. 14/831,657, filed on Aug. 20, 2015, now Pat. No. 10,373,379.

(51) Int. Cl.
G06T 19/00    (2011.01)
G06T 7/10    (2017.01)
(Continued)

(52) U.S. Cl.
CPC ........ *G06T 19/006* (2013.01); *G06K 9/00208* (2013.01); *G06T 7/10* (2017.01);
(Continued)

(58) Field of Classification Search
None
See application file for complete search history.

(56) References Cited

U.S. PATENT DOCUMENTS

2011/0286631 A1    11/2011    Wagner
2015/0199583 A1    7/2015    Nagatomo

OTHER PUBLICATIONS

Pilet, Julien. "Augmented reality for non-rigid surfaces." Vision, Laboratoire DE Ordinateur, PAR Doctoral, Programme Informatique, EN Information, Communications ET (2008) (Year: 2008).*

(Continued)

Primary Examiner — Sarah Le
(74) Attorney, Agent, or Firm — Farjami & Farjami LLP (57) ABSTRACT There are provided systems and methods for performing deformable-surface tracking based augmented reality image generation. In one implementation, such a system includes a hardware processor and a system memory storing an augmented reality three-dimensional image generator. The hardware processor is configured to execute the augmented reality three-dimensional image generator to receive image data corresponding to a two-dimensional surface, and to identify an image template corresponding to the two-dimensional surface based on the image data. In addition, the hardware processor is configured to execute the augmented reality three-dimensional image generator to determine a surface deformation of the two-dimensional surface. The hardware processor is further configured to execute the augmented reality three-dimensional image generator to generate an augmented reality three-dimensional image including at least one feature of the two-dimensional surface, based on the image template and the surface deformation of the two-dimensional surface.

20 Claims, 5 Drawing Sheets (51) Int. Cl.
*G06K 9/00* (2006.01)
*G06T 7/11* (2017.01)
*G06T 7/149* (2017.01)
*G06K 9/46* (2006.01)

(52) U.S. Cl.
CPC ............... *G06T 7/11* (2017.01); *G06T 7/149* (2017.01); *G06K 9/00671* (2013.01); *G06K 9/4676* (2013.01)

(56) References Cited

OTHER PUBLICATIONS

Jonas Ostlund et al., "Laplacian Meshes for Monocular 3D Shape Recovery",., EccV 2012, pp. 412-425 (Year: 2012).*

* cited by examiner

DEFORMABLE-SURFACE TRACKING BASED AUGMENTED REALITY IMAGE GENERATION

The present application is a Continuation of U.S. application Ser. No. 14/831,657, filed Aug. 20, 2015.

BACKGROUND

The visual richness and immersiveness provided by modern information and entertainment technologies have increasingly led users to abandon more traditional, tangible media, especially print media such as books, in favor of electronic media content. Nevertheless, some forms of tangible media have resisted translation into electronic form due to the physically interactive way that users of such tangible media typically engage with them. For example, an artist's tactile experience while marking a canvas, or that of a child marking a coloring book may not be easily replicated through use of a conventional electronic user interface. Thus, a real-time solution enabling generation of augmented reality images from tangible images produced or modified by hand is desirable in order to more fully extend the visual richness and immersiveness enabled by use of electronic media to the creative activities of artists and children.

SUMMARY

There are provided systems and methods for deformable-surface tracking based augmented reality image generation, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing deformable-surface tracking based augmented reality image generation. The solution disclosed in the present application allows typical users of media content enhanced by visual imagery, such as children, gamers, students, artists, and draftspersons, for example, to interact with augmented reality representations of images that may be modified by the users and are present on tangible, deformable-surfaces.

In some implementations, the user interaction with the augmented reality representation of the image modified by the user can occur in real-time. In addition, in some implementations, the user can interact with an augmented reality three-dimensional (3-D) representation of a tangible two-dimensional (2-D) deformable-surface including an image that has been modified by the user. Moreover, in some implementations, synthesized textures on the augmented reality representation, which correspond to features on the 2-D deformable-surface modified by the user, can be synthesized on regions of the augmented reality representation corresponding to portions of the feature not visible on the original 2-D deformable-surface. For example, a synthesized texture corresponding to a feature shown only in a frontal view by a 2-D deformable-surface may be propagated to the back and/or sides of an augmented reality 3-D representation of the 2-D deformable-surface.

Figure 1:
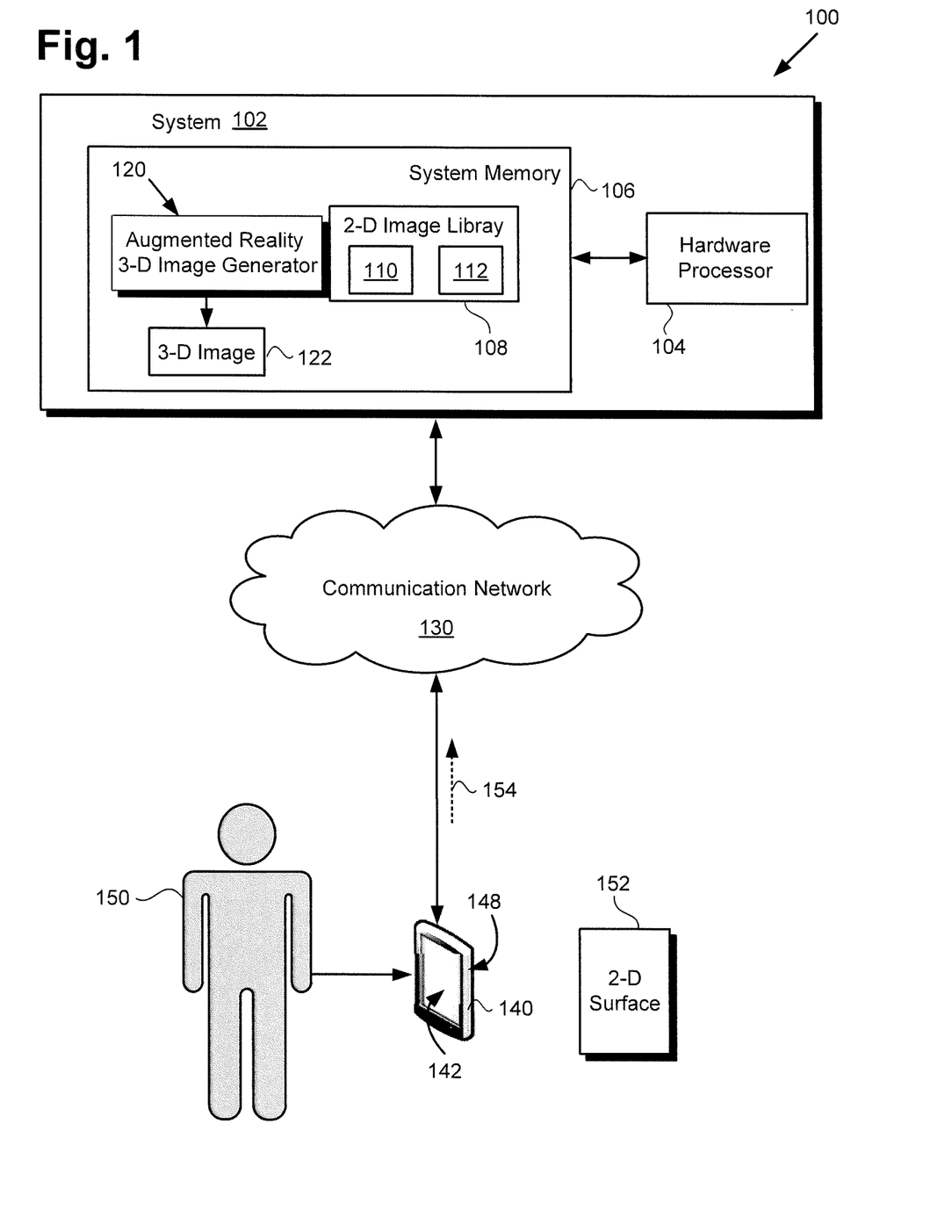
FIG. 1 shows a diagram of an exemplary system configured to perform deformable-surface tracking based augmented reality image generation, according to one implementation.

FIG. 1 shows a diagram of exemplary system 102 for performing deformable-surface tracking based augmented reality image generation, according to one implementation. As shown in FIG. 1, system 102 includes hardware processor 104 and system memory 106 storing 2-D image library 108 and augmented reality 3-D image generator 120. As further shown in FIG. 1, system 102 is situated in communication environment 100 including communication network 130 and user system 140 equipped with display 142 and camera 148. Also shown in FIG. 1 are 2-D image templates 110 and 112 stored in 2-D image library 108, augmented reality 3-D image 122 generated by augmented reality 3-D image generator 120, user 150 of user system 140, 2-D deformable-surface 152, and image data 154 corresponding to 2-D deformable-surface 152.

It is noted that although FIG. 1 depicts 2-D image library 108 and augmented reality 3-D image generator 120 as being mutually co-located in system memory 106, that representation is merely provided as an aid to conceptual clarity. More generally, system 102 may include one or more computing platforms, such as computer servers for example, which may be co-located, or may form an interactively linked but distributed system, such as a cloud based system, for instance. As a result, hardware processor 104 and system memory 106 may correspond to distributed processor and memory resources within system 102. Thus, it is to be understood that 2-D image library 108 and augmented reality 3-D image generator 120 may be stored remotely from one another within the distributed memory resources of system 102.

According to the implementation shown by FIG. 1, user 150 may utilize user system 140 to interact with augmented reality 3-D image generator 120 of system 102 over communications network 130. In one such implementation, system 102 may correspond to one or more web servers, accessible over a packet network such as the Internet, for example. Alternatively, system 102 may correspond to one or more media servers supporting a local area network (LAN), or included in another type of limited distribution network within a theme park or other entertainment venue, for example.

Although user system 140 is shown as a handheld mobile communication device in FIG. 1, such as a touch screen Smartphone or tablet computer, that representation is also provided merely as an example. In other implementations, user system 140 may be another type of mobile or stationary computing device or system including display 142 and camera 148. For example, user system 140 may take the form of a design kiosk in a theme park environment, or may be implemented as any of a suitably equipped desktop computer, laptop computer, or gaming console, for example.

It is noted that camera 148 may be a digital camera including a complementary metal-oxide-semiconductor (CMOS) or charged coupled device (CCD) image sensor configured to transform an image of 2-D deformable-surface 152 to digital image data 154 for processing by augmented reality 3-D image generator 120. Moreover, camera 148 may be a video camera configured to capture a video stream including multiple video frames in sequence.

According to the implementation shown in FIG. 1, hardware processor 104 may be configured to execute augmented reality 3-D image generator 120 to receive image data 154 corresponding to 2-D deformable-surface 152 from user system 140 over communication network 130. For example, augmented reality 3-D image generator 120 may be configured to receive digital image data 154 produced by camera 148 of user system 140. In addition, hardware processor 104 may be configured to execute augmented reality 3-D image generator 120 to identify an image template, such as one of 2-D image templates 110 and 112, corresponding to 2-D deformable-surface 152, based on image data 154, and to determine a surface deformation of 2-D deformable-surface 152 as will be described in greater detail below. Hardware processor 104 may be further configured to execute augmented reality 3-D image generator 120 to generate augmented reality 3-D image 122 including at least one feature of 2-D deformable-surface 152 based on the image template and the surface deformation of 2-D deformable-surface 152.

It is noted that although FIG. 1 depicts augmented reality 3-D image 122 as residing in system memory 106, in some implementations, augmented reality 3-D image 122, when completed, may be copied to non-volatile storage (not shown in FIG. 1), or may be transmitted to user system 140 via communication network 130. For example, augmented reality 3-D image 122 may be transmitted to user system 140 for display to user 150 on display 142 of user system 140.

Figure 2:
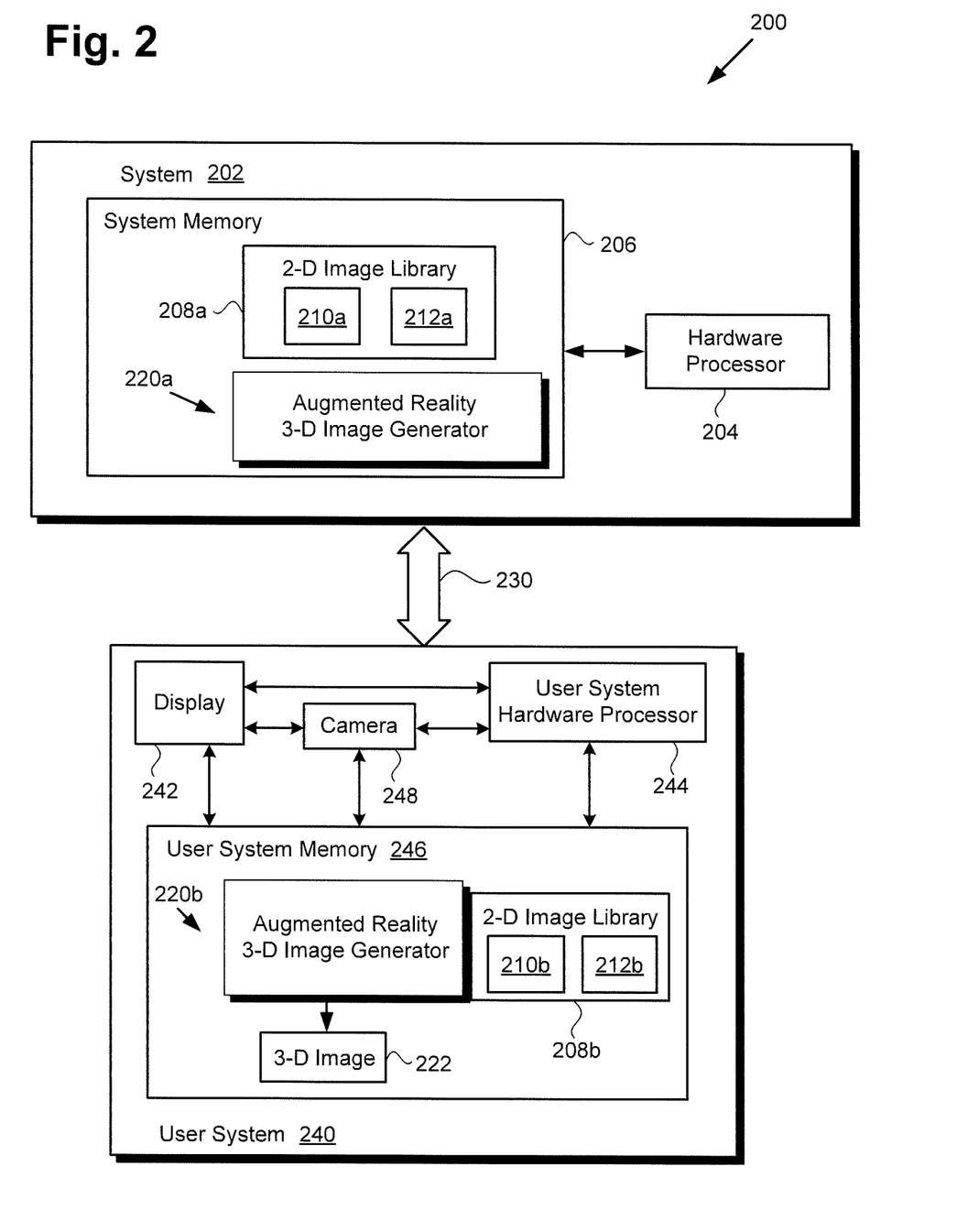
FIG. 2 shows another exemplary implementation of a system configured to perform deformable-surface tracking based augmented reality image generation.

Turning now to FIG. 2, FIG. 2 shows a diagram of an exemplary system for performing deformable-surface tracking based augmented reality image generation, according to one implementation. Communication environment 200, in FIG. 2 shows user system 240 equipped with display 242 and camera 248, and receiving a data transfer via communication link 230 from system 202. System 202 is shown to include hardware processor 204 and system memory 206 storing augmented reality 3-D image generator 220a, and 2-D image library 208a including 2-D image templates 210a and 212a.

Communication link 230, and system 202 including hardware processor 204 and system memory 206 correspond in general to respective communication network 130, and system 102 including hardware processor 104 and system memory 106, in FIG. 1, and may share any of the characteristics attributed to those corresponding features by the present disclosure. In addition, 2-D image library 208a including 2-D image templates 210a and 212a, and augmented reality 3-D image generator 220a, stored in system memory 206, correspond in general to respective 2-D image library 108 including 2-D image templates 110 and 112, and augmented reality 3-D image generator 120, stored in system memory 106, and may share any of the characteristics attributed to those corresponding features by the present disclosure.

User system 240 having display 242 and camera 248, in FIG. 2, corresponds in general to user system 140 having display 142 and camera 148, in FIG. 1, and may share any of the characteristics attributed to that corresponding feature by the present disclosure. As shown in FIG. 2, in addition to display 242 and camera 248, user system 240 includes user system hardware processor 244, and user system memory 246 storing 2-D image library 208b including 2-D image templates 210b and 212b, and augmented reality 3-D image generator 220b. Also shown in FIG. 2 is augmented reality 3-D image 222 generated by augmented reality 3-D image generator 222b of user system 240. It is noted that augmented reality 3-D image 222 corresponds in general to augmented reality 3-D image 122, in FIG. 1, and may share any of the characteristics attributed to that corresponding feature by the present disclosure.

According to the implementation shown in FIG. 2, 2-D image library 208b including 2-D image templates 210b and 212b, and augmented reality 3-D image generator 220b are located in user system memory 246, having been received from system 202 via communication link 230. In the present implementation, communication link 230 represents download of 2-D image library 208b and augmented reality 3-D image generator 220b over a packet network, such as the Internet, for example. Once downloaded to user system memory 246, augmented reality 3-D image generator 220b may be executed locally on user system 240, by user system hardware processor 244. User system hardware processor 244 may be the central processing unit for user system 240, for example, in which role user system hardware processor 244 runs the user system operating system and controls user system memory 246, display 242, and camera 248, as well as executing augmented reality 3-D image generator 220b.

Figure 3:
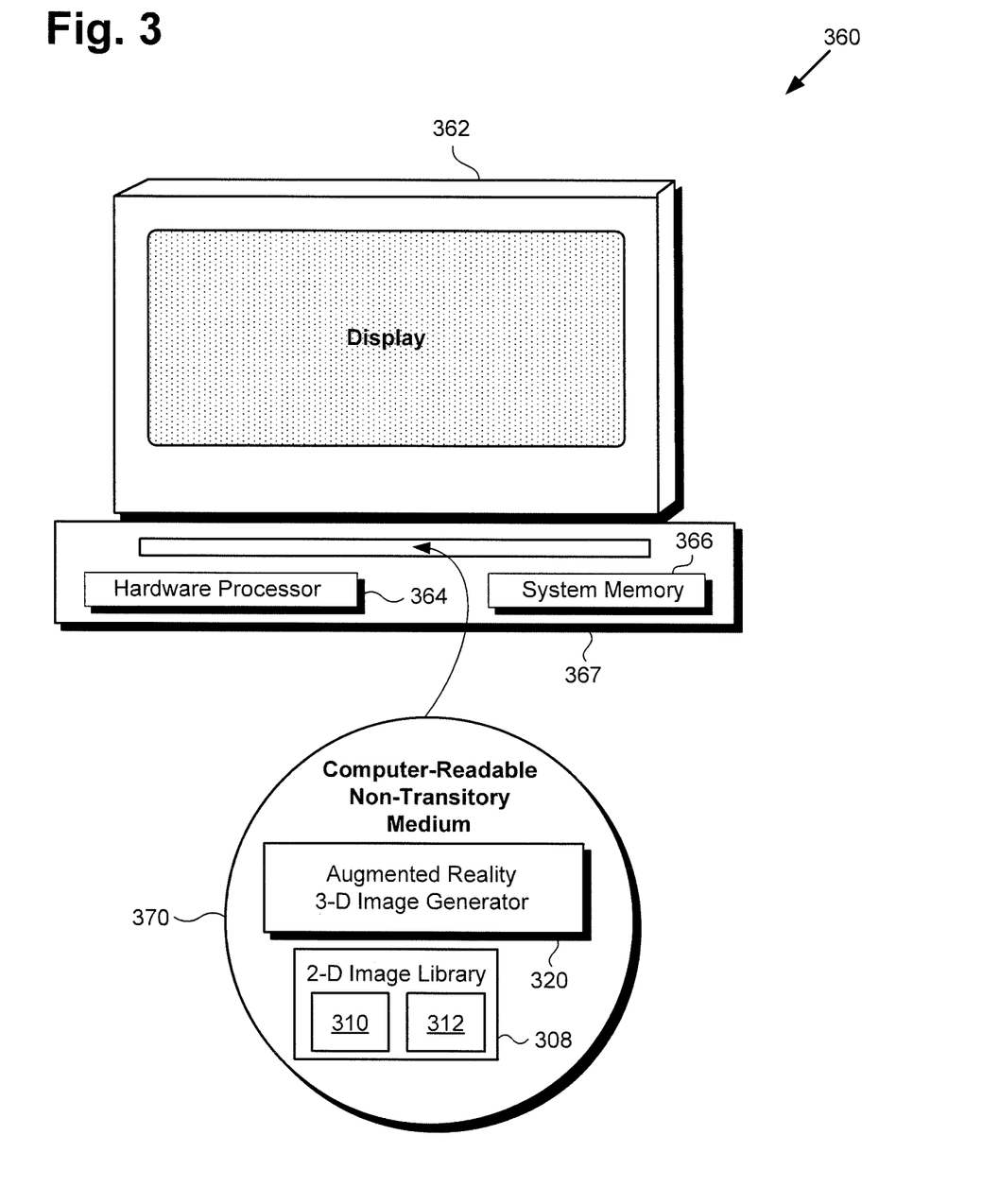
FIG. 3 shows an exemplary system and a computer-readable non-transitory medium including instructions enabling deformable-surface tracking based augmented reality image generation, according to one implementation.

Moving now to FIG. 3, FIG. 3 shows an exemplary system and a computer-readable non-transitory medium including instructions enabling performance of deformable-surface tracking based augmented reality image generation, according to one implementation. System 360, in FIG. 3, includes computing unit 367 including hardware processor 364 and system memory 366, interactively linked to display 362. Display 362 may take the form of a liquid crystal display (LCD), a light-emitting diode (LED) display, an organic light-emitting diode (OLED) display, or another suitable display screen that performs a physical transformation of signals to light. System 360 including hardware processor 364 and system memory 366 corresponds in general to any or all of system 102 and user system 140, in FIG. 1, and system 202 and user system 240, in FIG. 2.

Also shown in FIG. 3 is computer-readable non-transitory medium 370 having 2-D image library 308 including 2-D image templates 310 and 312, and augmented reality 3-D image generator 320 stored thereon. The expression "computer-readable non-transitory medium," as used in the present application, refers to any medium, excluding a carrier wave or other transitory signal, that provides instructions to hardware processor 364 of computing unit 367. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 370 provides augmented reality 3-D image generator 320 for execution by hardware processor 364 of computing unit 367. Augmented reality 3-D image generator 320, when executed by hardware processor 364, instantiates an augmented reality 3-D image generator corresponding to augmented reality 3-D image generator 120/220a/220b, in FIGS. 1 and 2, and capable of performing all of the operations attributed to those corresponding features by the present disclosure.

Figure 4:
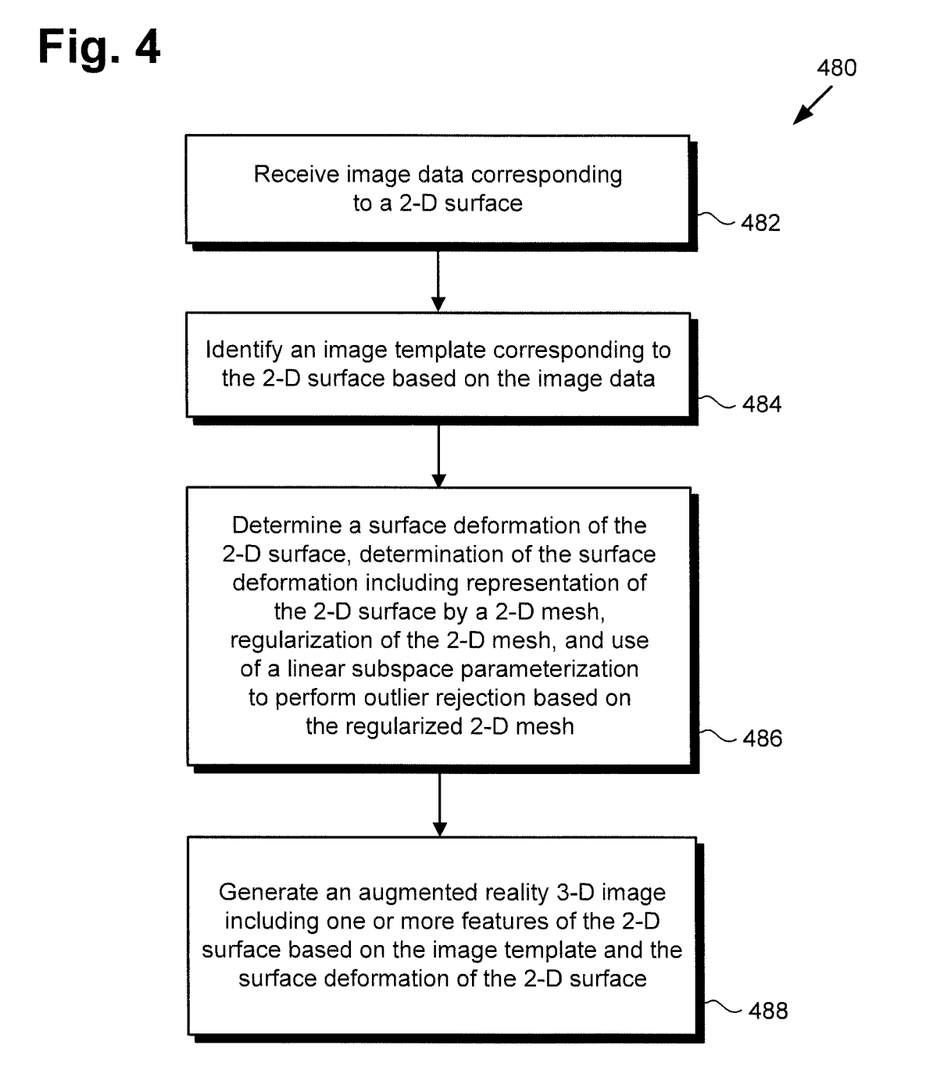
FIG. 4 is a flowchart presenting an exemplary method for use by a system to perform deformable-surface tracking based augmented reality image generation.
Figure 5A:
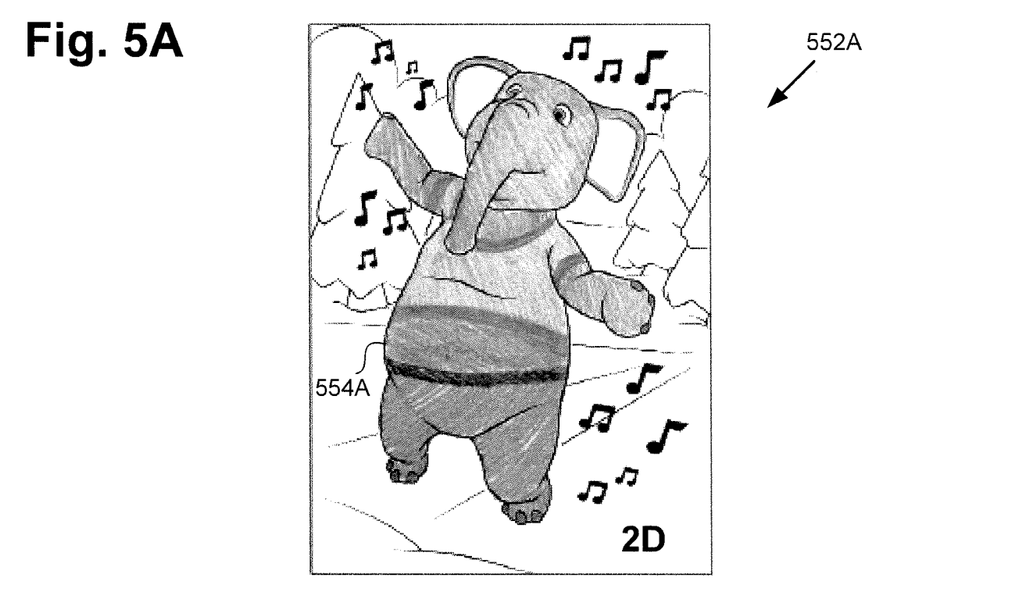
FIG. 5A shows an exemplary deformable-surface depicted as a page in a coloring book including a user modified feature, according to one implementation.
Figure 5B:
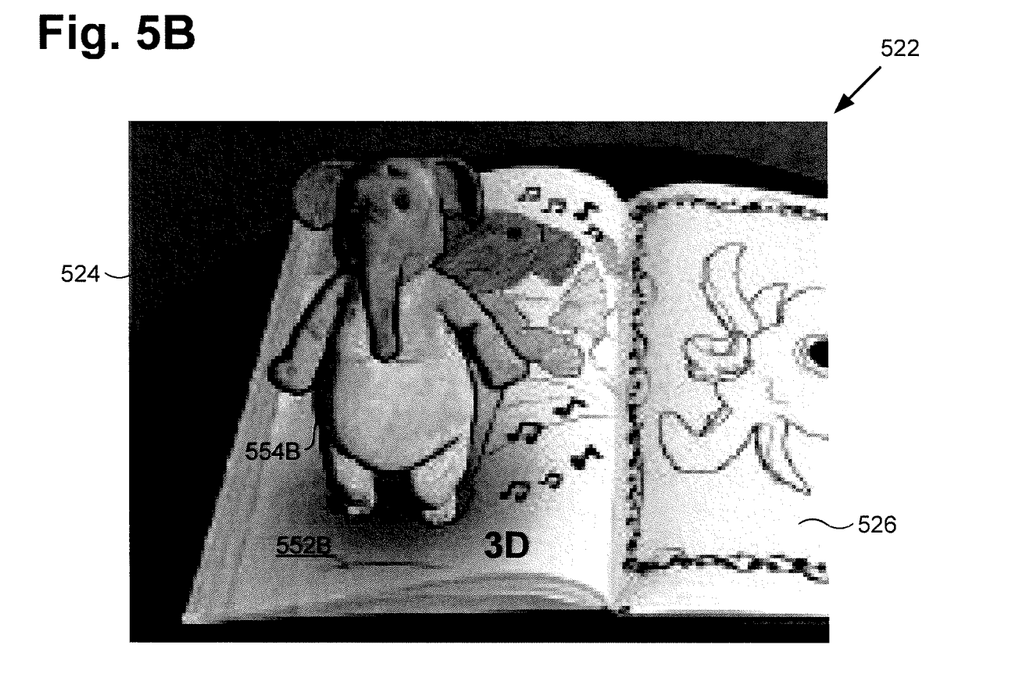
FIG. 5B shows an exemplary augmented reality three-dimensional image generated based on the deformable-surface shown in FIG. 5A.

The present inventive concepts will now be further described with reference to FIG. 4 in combination with FIGS. 5A and 5B, as well as FIGS. 1, 2, and 3. FIG. 4 is a flowchart presenting an exemplary method for use by a system to perform deformable-surface tracking based augmented reality image generation. FIG. 5A shows an exemplary 2-D deformable-surface depicted as a page from a coloring book including a user modified feature, while FIG. 5B shows an exemplary augmented reality 3-D image generated based on the 2-D deformable-surface shown in FIG. 5A. With respect to the method outlined in FIG. 4, it is noted that certain details and features have been left out of flowchart 400 in order not to obscure the discussion of the inventive features in the present application.

Referring first to FIG. 5A, FIG. 5A shows 2-D deformable-surface 552A in the form of a page from a children's coloring book. As further shown in FIG. 5A, 2-D deformable-surface 552A includes several distinct features including feature 554A depicting an elephant that has been modified by a user through being colored. Referring to FIG. 5B, FIG. 5B shows augmented reality 3-D image 522 corresponding to 2-D deformable-surface 552A. Augmented reality 3-D image 522 depicts an augmented reality representation of a use environment for 2-D deformable-image 552A, including environmental background 524 and coloring book 526 having augmented reality 3-D representation 552B of 2-D deformable-surface 552A as a page of coloring book 526. Augmented reality 3-D image 522 also includes a rendering of feature 554A of 2-D deformable-surface 552A as interactive augmented reality 3-D feature 554B. It is noted that 2-D deformable-surface 552A in FIG. 5A corresponds in general to 2-D deformable-surface 152, in FIG. 1, while augmented reality 3-D image 522, in FIG. 5B, corresponds in general to augmented reality 3-D image 122/222 in FIGS. 1 and 2.

Referring now to FIG. 4 in combination with FIGS. 1, 2, 3, and 5A, flowchart 400 begins with receiving image data 154 corresponding to 2-D surface 152/552A (action 482). Hardware processor 104/204/244/364 of system 102/202/240/360 may be configured to execute augmented reality 3-D image generator 120/220a/220b/320 to receive image data 154 corresponding to 2-D surface 152/552A. As noted above, 2-D surface 152/552A may be a 2-D deformable-surface, such as a nominally flat page bound into a book and caused to flex or warp as a result.

Image data 154 corresponding to 2-D deformable-surface 152/552A may be produced by camera 148/248 of user system 140/240, which may be configured to transform 2-D deformable-surface 152/552A into digital coloring book image data 154 under the control of user system hardware processor 244. For example, as noted above, camera 148/248 may be a video camera configured to capture a video stream of 2-D deformable-surface 152/552A including multiple video frames of 2-D deformable-surface 152/552A in sequence.

It is noted that although 2-D deformable-surface 152/552A is represented as a page from a children's coloring book in FIG. 5A, that representation is merely by way of example. More generally, 2-D deformable-surface 152/552A can correspond to a wide variety of deformable-surfaces, such as art works, photographs, maps, posters, advertising materials, instructional materials, and technical data sheets, to name a few examples.

Flowchart 400 continues with identifying an image template corresponding to 2-D deformable-surface 152/552A based on image data 154 (action 484). Hardware processor 104/204/244/364 may be configured to execute augmented reality 3-D image generator 120/220a/220b/320 to identify an image template stored in 2-D image library 108/208a/208b/308 as corresponding to 2-D deformable-surface 152/552A. For example, one of 2-D image templates 110/210a/210b/310 or 112/212a/212b/312 may be identified as corresponding to 2-D deformable-surface 152/552A based on image data 154.

In the coloring book context, it may be advantageous or desirable to remove colors and keep the black lines in the image appearing on 2-D deformable-surface 152/552A for the purposes of identifying an image template corresponding to 2-D deformable-surface 152/552A. As a result, image data 154 corresponding to 2-D deformable-surface 152/552A may be transformed from the red-green-blue (RGB) color space to the hue-saturation-lightness (HSV) color space, in which only the luminance channel is used because it captures most information about the original black line draws. Line draws are typically more visible in the HSV luminance channel than in the gray scale image. Adaptive thresholding may then be applied to the luminance image to obtain a binary line draw image. Small noisy connected components can be removed and Gaussian smoothing with variance $\sigma hu$ $2=1$ pixel can be used to remove the staircase effect of binarization. The described color removal procedure can be performed automatically by augmented reality 3-D image generator 120/220a/220b/320, under the control of hardware processor 104/204/244/364.

To detect which of 2-D image templates 110/210a/210b/310 or 112/212a/212b/312 corresponds to 2-D deformable-surface 152/552A, the processed image data is compared with the image templates stored in 2-D image library 108/208a/208b/308. A sparse set of scale and rotation invariant feature points is detected, and a voting scheme is used to determine what image template should be selected for further steps.

The number of feature pointes detected in a particular 2-D deformable-surface may be in a range from approximately three hundred to approximately two thousand (300-2000), for example. As a specific example, approximately five hundred (500) feature points may be detected on 2-D deformable-surface 152/552A, and the descriptors of those feature points, expressed as binary vectors, may be extracted. The concept of the voting scheme employed is that each feature point descriptor extracted from 2-D deformable-surface 152/552A votes for one existing image template having the closest descriptor according to the Hamming metric.

Specifically, all feature point descriptors, expressed as binary vectors, can be projected to a low d-dimension space (e.g., d=7) using a pre-generated random projection matrix. K nearest neighbors (e.g., K=100) in such a low dimension space can be searched rapidly using k-d trees. Once the K-nearest-neighbor search has been performed, the feature point descriptor binary space can be utilized to select the nearest descriptors among the K candidates. A Hamming threshold may then be used to filter the better matches. The image template with the highest votes is identified as corresponding to 2-D deformable-surface 152/552A.

Flowchart 400 continues with determining a surface deformation of 2-D deformable-surface 152/552A (action 486). Hardware processor 104/204/244/364 may be configured to execute augmented reality 3-D image generator 120/220a/220b/320 to determine a surface deformation of 2-D deformable-surface 152/552A using a combination of techniques including outlier rejection, and deformable-surface reconstruction and tracking.

It is noted that once at least a preliminary identification of the image template corresponding to 2-D deformable-surface 152/552A has been made, wide-baseline correspondences can be established between the identified image template and image data 154. Such a matching process may be performed quickly using brute-force searching in the known Hamming metric, after which outliers must be identified and removed, i.e., outlier rejection is performed. The present solution for deformable-surface tracking based augmented reality image generation introduces a new approach to performing outlier rejection. The outlier rejection technique utilized in the present application performs outlier rejection using a 2-D mesh, and in contrast to conventional solutions, can be used with irregular as well as regular meshes. Furthermore, the computational complexity of the resulting optimization problem can be advantageously reduced through use of linear subspace parameterization.

For example, 2-D deformable-surface 152/552A can be represented by a 2-D triangular mesh, and a regularization matrix can be used on its x and y components to regularize the mesh. Consequently, the initial 2-D triangular mesh used to represent 2-D deformable-surface 152/552A may be regular or irregular. In one implementation, the present method includes solving for a 2-D mesh that is smooth and substantially matches 2-D deformable-surface 152/552A. The linear subspace parameterization x=Pc, where x is a vector of variables $x=[v_1; \ldots ; v_{Nv}]$, P is a constant parameterization matrix, and c expresses the coordinates of a small number $N_c$ of control vertices as $c=[v_{i1}; \ldots ; v_{iNc}]$, is used to reduce the complexity of the problem. The following optimization problem, expressed as Equation (1), is solved:

$$\min_c \ \rho(BPc - U.r) + \lambda_S^2 \|APc\|^2,$$

where c represents 2-D control vertices, A is the regularization matrix, B represents the barycentric coordinates of the feature points in matrix form, and U encodes the feature point locations in 2-D deformable-surface 152/552A. Furthermore, ρ is a robust estimator whose radius of confidence is r and is defined by Equation (2) as:

$$\rho(\delta.r) = \begin{cases} \dfrac{3(r^2 - \delta^2)}{4r^3} & -r < \delta < r \\ 0 & \text{otherwise} \end{cases}$$

Equation (1) can be solved directly using a linear least squares approach with a large starting radius of confidence that is reduced by half at each iteration. The result of this iterative process is a both robust and very fast approach for performing outlier rejection. In other words, the present solution includes representing 2-D deformable-surface 152/552A by a 2-D mesh, regularizing the 2-D mesh, and using a linear subspace parameterization to perform outlier rejection based on the regularized 2-D mesh.

Once outlier rejection is completed such that outlier correspondences are substantially eliminated, the following equation identified as Equation (3) may be solved only once:

$$\min_c \ \|MPc\|^2 + w_r^2 \|APc\|^2, \text{ s.t. } \|c\| = 1$$

The solution to Equation (3) can then be scaled to give initialization for the constrained optimization in Equation (4):

$$\min_c \ \|MPc\|^2 + w_r^2 \|APc\|^2, \text{ s.t. } C(Pc) \le 0$$

It is noted that soft constraints that allow the edge lengths to slightly vary around their reference lengths can be used. As a result, a simpler optimization problem with fewer variables can still arrive at sufficiently accurate reconstructions for augmented reality purposes. In addition, a motion model may be used to temporally regularize the solution. Since the tracking video frame rate is typically high, a linear motion model may be sufficient. We solve Equation (5):

$$\min_c \ \|MPc\|^2 + w_r^2 \|APc\|^2 + \lambda^2 \|C(Pc)\|^2 + \gamma^2 \|c_{t-2} - 2c_{t-1} + c\|^2,$$

in which $c_{t-1}$ and $c_{t-2}$ are solutions to the previous two video frames.

Using the linear motion model, the 3-D pose of 2-D deformable-surface 152/552A in the next video frames can be predicted, and an occlusion mask can be created wherein the surface projection should be in the next input image. This technique helps to speed up the feature point detection and matching. It also improves the robustness of the present solution because gross outliers are limited.

The fact that the shape of 2-D deformable-surface 152/552A and the perspective of camera 148/248 typically change only slightly between two consecutive video frames is utilized to aid deformable-surface tracking. As a result of that typically slight frame-to-frame change, the motion model can be used to predict the shape for the current frame, and that prediction can be used to initialize the reconstruction of 2-D deformable-surface 152/552A. It is noted that the present solution is capable of successfully performing deformable-surface tracking under extreme tilts and large deformations. Moreover, frame-to-frame tracking can be used to gain frame rate and only requires application of the feature detection and matching once every approximately ten frames to retrieve lost tracked points and to accumulate good correspondences, thereby enhancing the efficiency and reducing the computational overhead of the present solution.

Referring now to 5B in combination with FIGS. 1, 2, 3, and 5A exemplary flowchart 400 can conclude with generating augmented reality 3-D image 122/222/522 including one or more features of 2-D deformable-surface 152/552A based on the image template identified as corresponding to 2-D deformable-surface 152/552A and the surface deformation of 2-D deformable-surface 152/552A (action 488). Hardware processor 104/204/244/364 may be configured to execute augmented reality 3-D image generator 120/220a/220b/320 to generate augmented reality 3-D image 122/222/522. As shown by FIG. 5B, augmented reality 3-D image 522 corresponds to 2-D deformable-surface 552A. Moreover, and as noted above, augmented reality 3-D image 522 depicts coloring book 526 including augmented reality 3-D representation 552B of 2-D deformable-surface 552A as a page of coloring book 526. As further noted above, augmented reality 3-D image 522 also includes a rendering of feature 554A of 2-D deformable-surface 552A as interactive augmented reality 3-D feature 554B.

Although not described in flowchart 400, in some implementations, the present method may include displaying augmented reality 3-D image 122/222/522 to user 140. For example, hardware processor 104/204/244/364 may be configured to execute augmented reality 3-D image generator 120/220a/220b/320 to display augmented reality 3-D image 122/222/522 to user 140 on display 142/242/362. In some implementations, augmented reality 3-D image 122/222/522 may be displayed to user 140 as part of a media content such as entertainment content, game content, or educational content, for example. Moreover, in implementations in which image data 154 corresponding to 2-D deformable-surface 552A includes color data corresponding one or more colors appearing on 2-D deformable-surface 552A, hardware processor 104/204/244/364 may be further configured to execute augmented reality 3-D image generator 120/220a/220b/320 to substantially reproduce the color or colors in augmented reality 3-D image 122/222/522.

In some implementations, the exemplary method outlined by flowchart 400 may include enabling user 140 to interact with augmented reality 3-D image 122/222/522 by entering inputs to system 102/140/202/240/360. For example, user 140 may enter inputs such as touch screen or mouse mediated inputs commanding movement of interactive augmented reality 3-D feature 554B within augmented reality 3-D image 122/222/522, and/or interaction by interactive augmented reality 3-D feature 554B with other augmented reality representations included in augmented reality 3-D image 122/222/522. Furthermore, in some implementations, hardware processor 104/204/244/364 may be configured to execute augmented reality 3-D image generator 120/220a/220b/320 to enable user 140 to interact with augmented reality 3-D image 122/222/522 in real-time.

Thus, the present application discloses systems and methods for performing deformable-surface tracking based augmented reality image generation. The solution disclosed in the present application allows typical users of media content enhanced by visual imagery, such as children, garners, students, artists, and draftspersons, for example, to interact with augmented reality representations of images that may be modified by the users and are present on tangible, deformable-surfaces. In addition, the solution disclosed in the present application enables a user to interact with an augmented reality 3-D representation a 2-D image modified by the user in real-time, using a handheld mobile communication device such as a Smartphone or tablet computer.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a hardware processor;
    a system memory having an augmented reality three-dimensional image generator stored therein;
    wherein the hardware processor is configured to execute the augmented reality three-dimensional image generator to:
        receive image data corresponding to a two-dimensional surface;
        remove colors from the image data by transforming the image data from a red-green-blue (RGB) color space to a hue-saturation-lightness (HSV) color space to provide a luminance image data;
        identify an image template corresponding to the two-dimensional surface based on the luminance image data;
        determine a surface deformation of the two-dimensional surface, wherein determining the surface deformation includes representing the two-dimensional surface by a two-dimensional mesh, regularizing the two-dimensional mesh, and performing an outlier rejection based on the regularized two-dimensional mesh;
        after performing the outlier rejection, apply a three-dimensional optimization to the surface deformation of the two-dimensional surface;
        generate an augmented reality three-dimensional image using the three-dimensional optimized surface deformation of the two-dimensional surface and based on the image template; and
        reproduce one or more of the colors from the image data in the augmented reality three-dimensional image.

2. The system of claim 1, further comprising a camera configured to produce the image data.

3. The system of claim 1, wherein the outlier rejection uses a linear subspace parameterization.

4. The system of claim 1, wherein the system is further configured to display the augmented reality three-dimensional image to a user of the system.

5. The system of claim 1, wherein the system is further configured to display the augmented reality three-dimensional image to a user of the system as part of a media content in the form of one of entertainment content, game content, or educational content.

6. The system of claim 1, wherein the augmented reality three-dimensional image is an interactive image.

7. The system of claim 1, the hardware processor being further configured to execute the augmented reality three-dimensional image generator to apply an adaptive threshold to the luminance image data.

8. A method for use by a system including a hardware processor and an augmented reality three-dimensional image generator stored in a system memory, the method comprising:
    receiving, using the hardware processor, image data corresponding to a two-dimensional surface;

removing, using the hardware processor, colors from the image data by transforming the image data from a red-green-blue (RGB) color space to a hue-saturation-lightness (HSV) color space to provide a luminance image data;

identifying, using the hardware processor, an image template corresponding to the two-dimensional surface based on the luminance image data;

determining, using the hardware processor, a surface deformation of the two-dimensional surface, wherein determining the surface deformation includes representing the two-dimensional surface by a two-dimensional mesh, regularizing the two-dimensional mesh, and performing an outlier rejection based on the regularized two-dimensional mesh;

after performing the outlier rejection, applying, using the hardware processor, a three-dimensional optimization to the surface deformation of the two-dimensional surface;

generating, using the hardware processor, an augmented reality three-dimensional image using the three-dimensional optimized surface deformation of the two-dimensional surface and based on the image template; and reproducing, using the hardware processor, one or more of the colors from the image data in the augmented reality three-dimensional image.

9. The method of claim 8, further comprising, producing, using the hardware processor, the image data corresponding to the two-dimensional image.

10. The method of claim 8, wherein the outlier rejection uses a linear subspace parameterization.

11. The method of claim 8, further comprising displaying, using the hardware processor, the augmented reality three-dimensional image to a user of the system.

12. The method of claim 8, further comprising displaying, using the hardware processor, the augmented reality three-dimensional image to a user of the system as part of a media content in the form of one of entertainment content, game content, or educational content.

13. The method of claim 8, wherein the augmented reality three-dimensional image is an interactive image.

14. The method of claim 8, further comprising applying, using the hardware processor, an adaptive threshold to the luminance image data.

15. A non-transitory computer-readable medium having stored thereon instructions, which when executed by a hardware processor, instantiate a method comprising:

receiving image data corresponding to a two-dimensional surface;

removing colors from the image data by transforming the image data from a red-green-blue (RGB) color space to a hue-saturation-lightness (HSV) color space to provide a luminance image data;

identifying an image template corresponding to the two-dimensional surface based on the luminance image data;

determining a surface deformation of the two-dimensional surface, wherein determining the surface deformation includes representing the two-dimensional surface by a two-dimensional mesh, regularizing the two-dimensional mesh, and performing an outlier rejection based on the regularized two-dimensional mesh;

after performing the outlier rejection, applying a three-dimensional optimization to the surface deformation of the two-dimensional surface;

generating an augmented reality three-dimensional image using the three-dimensional optimized surface deformation of the two-dimensional surface and based on the image template; and reproducing one or more of the colors from the image data in the augmented reality three-dimensional image.

16. The non-transitory computer-readable medium of claim 15, wherein the method further comprises producing the image data corresponding to the two-dimensional image.

17. The non-transitory computer-readable medium of claim 15, wherein the outlier rejection uses a linear subspace parameterization.

18. The non-transitory computer-readable medium of claim 15, wherein the method further comprises displaying the augmented reality three-dimensional image to a user of the system.

19. The non-transitory computer-readable medium of claim 15, wherein the method further comprises displaying the augmented reality three-dimensional image as part of a media content in the form of entertainment content, game content, or educational content.

20. The non-transitory computer-readable medium of claim 15, wherein the augmented reality three-dimensional image is an interactive image.

* * * * *